United States Patent
Sorenson et al.

(10) Patent No.: US 6,396,179 B2
(45) Date of Patent: May 28, 2002

(54) RETRACTABLE GROUNDING DEVICE FOR A SPINDLE MOTOR

(75) Inventors: Gary D. Sorenson, Eden Prairie; Thomas J. Schmitt, Apple Valley; Klaus Obergfell, Minneapolis; James H. McGlennen, Eden Prairie, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/864,361

(22) Filed: May 23, 2001

Related U.S. Application Data
(60) Provisional application No. 60/206,871, filed on May 24, 2000.

(51) Int. Cl.$^7$ .......................... H02K 13/00; H02K 11/00
(52) U.S. Cl. ........................... 310/71; 439/13; 439/20; 360/97.02
(58) Field of Search .................... 310/71, 67 R, 310/239, 240; 439/17, 18, 28, 20, 13, 11; 360/97.02

(56) References Cited

U.S. PATENT DOCUMENTS

| | | | |
|---|---|---|---|
| 4,378,138 A | * 3/1983 | Sohre | 339/5 R |
| 4,623,952 A | * 11/1986 | Pexton | 361/220 |
| 4,701,653 A | 10/1987 | Merkle et al. | 310/152 |
| 4,780,777 A | * 10/1988 | Biermeier et al. | 360/98 |
| 4,999,724 A | 3/1991 | McAllister et al. | 360/99.08 |
| 5,140,479 A | * 8/1992 | Elsing et al. | 360/97.01 |
| 5,227,950 A | * 7/1993 | Twerdochlib | 361/221 |
| 5,729,404 A | * 3/1998 | Dunfield et al. | 360/99.08 |
| 5,844,748 A | * 12/1998 | Dunfield et al. | 360/99.08 |
| 5,914,547 A | * 6/1999 | Barahia et al. | 310/71 |
| 6,116,901 A | 9/2000 | Kangasniemi | 433/89 |
| 6,122,232 A | 9/2000 | Schell et al. | 369/44.11 |

FOREIGN PATENT DOCUMENTS

| | | | | |
|---|---|---|---|---|
| JP | 03014906 | * | 1/1991 | 310/71 |
| JP | 04325852 | * | 11/1992 | 310/89 |
| JP | 06141505 | * | 4/1994 | 310/89 |

* cited by examiner

*Primary Examiner*—Karl Tamai
(74) *Attorney, Agent, or Firm*—Westman, Champlin & Kelly, P.A.

(57) ABSTRACT

A retractable grounding device for a spindle motor having a rotor shaft is provided. The retractable grounding device includes a grounding connector configured to connect the rotor shaft to ground and a position adjuster coupled to the grounding connector. The position adjuster moves the grounding connector between a first position where the grounding connector is in contact with the rotor shaft and a second position where the grounding connector is retracted from the rotor shaft. In addition, a method of selectively grounding a rotor shaft of a spindle motor is provided.

18 Claims, 5 Drawing Sheets

RETRACTABLE GROUNDING DEVICE FOR A SPINDLE MOTOR

CROSS-REFERENCE TO RELATED APPLICATION

This application claims priority benefits from U.S. Provisional Patent Application Ser. No. 60/206,871, filed May 24, 2000 and entitled "RETRACTABLE GROUNDING CONTACT FOR HGA DYNAMIC ELECTRICAL TESTERS".

FIELD OF THE INVENTION

The present invention relates to disc drive data storage systems. In particular, the present invention relates to a retractable grounding device for spindle motors employed in disc drives and spin-stand testers.

BACKGROUND OF THE INVENTION

Disc drives are typically used in computer systems as mass storage devices to store recorded data. These disc drives and their test apparatus (spin-stands) usually incorporate one or more discs mounted for rotation on the rotor shaft of a spindle motor. Data is recorded to and read from a plurality of concentric tracks on the discs by an array of read/write heads. The heads are typically moved radially from track to track on the discs by an actuator assembly.

Advances in disc drive technology have revolved around reducing the size of disc drive components and the size of the overall disc drive. Smaller disc drives can allow for a reduction in overall size of computer systems into which disc drives are installed. With the reduction in the size of the disc drive, more space is available within the computer system for other components. In addition to the small disc drives, the disc drive industry has also made advances toward increasing the storage capacity of individual disc drive units.

The reduction in size of the disc drive can compound certain problems often associated with various operational features of disc drives. It also places greater performance demands on spin-stands used to test various components of the disc drive. One such problem involves vibrations or harmonic oscillations in the disc drive and spin-stand tester. The effect of vibrations and oscillations has become magnified as the size of the drive is reduced and data tracks are spaced closer together. As a result, the overall performance of the drive and spin-stand are negatively impacted.

One source of vibration in a disc drive and a spin-stand is the grounding technique used in a typical spindle motor that they employ. The rotor of this spindle motor is electrically grounded through a conductive mechanical connector. One end on the connector is electrically connected to ground and the other end presses against the shaft on the rotor. Rubbing between the mechanical connector and the rotor introduces mechanical vibration into the rotor that gets transferred to the media mounted on the rotor. Media vibrations degrade disc drive and spin-stand tester performance such that reading and writing performance is reduced in a disc drive and read/write head yields are reduced in a spin-stand tester. As explained above, this problem worsens as areal densities (amount of data that can be squeezed on to a given area of the disc medium) increase.

The present invention addresses these problems, and offers other advantages over the prior art.

SUMMARY OF THE INVENTION

The present invention relates to data storage systems that include a spindle motor that employs a retractable grounding device that is retracted form a rotor shaft of the spindle motor when the rotor shaft is spinning, thereby addressing the above-identified problems.

A retractable grounding device for a spindle motor having a rotor shaft is provided. The retractable grounding device includes a grounding connector configured to connect the rotor shaft to ground and a position adjuster coupled to the grounding connector. The position adjuster moves the grounding connector between a first position where the grounding connector is in contact with the rotor shaft and a second position where the grounding connector is retracted from the rotor shaft. In addition, a method of selectively grounding a rotor shaft of a spindle motor is provided.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
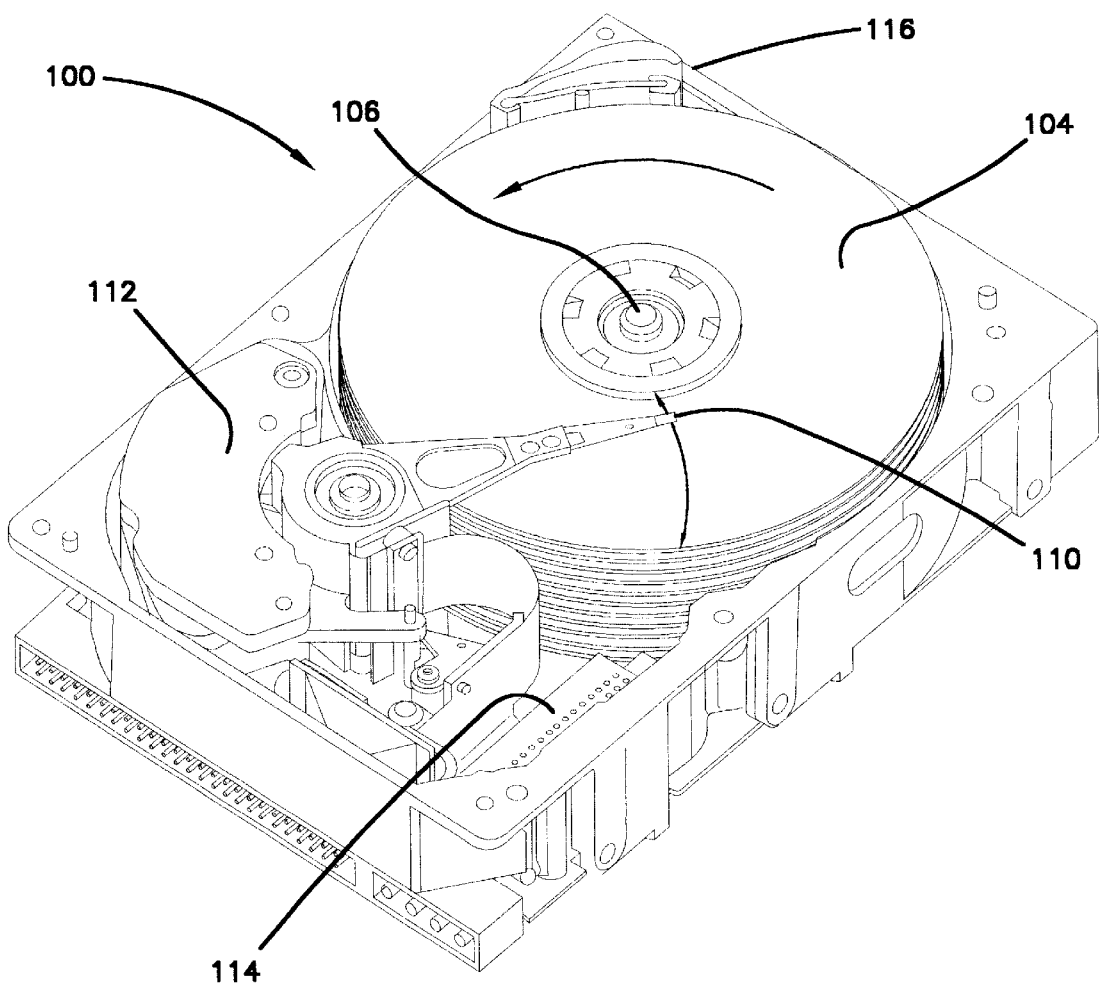
FIGS. 1 and 2 are diagrammatic and system block views, respectively, of an exemplary fixed disc drive for which embodiments of the present invention are useful.
Figure 2:
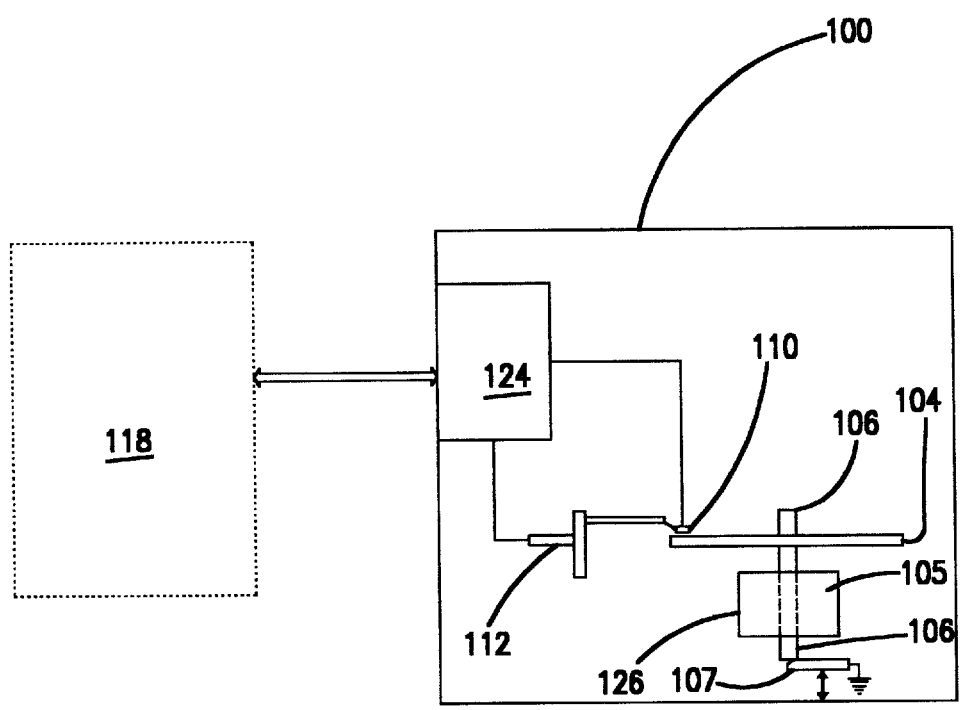

Referring now to FIG. 1, a diagrammatic view of an example of a disc drive 100 with which the present invention is useful is shown. Disc drive 100 includes discs 104, shaft 106, spindle motor 126 (shown in FIG. 2), retractable grounding device 107 (shown in FIG. 2) for shaft 106, head 110, actuator 112, and board electronics 114. Board electronics 114 include disc controller 124 (shown in FIG. 2).

Controller 124 is typically a microprocessor, or digital computer, and is coupled to a host system 118, or another drive controller which controls a plurality of drives. Controller 124 operates based on programmed instructions received from the host system.

Discs 104 are fixed about shaft or spindle 106, which is coupled to spindle motor 126 such that energization of spindle motor 126 causes shaft 106 and discs 104 to rotate. Usually, when discs 104 rotate, heads 110 fly above/below discs 104 on thin films of air or liquid that carry heads 110 for communicating with the respective disc surface. In discs employing a contact method of recording, when the discs 104 rotate, heads 110 remain in contact with the discs 104. Actuator 112 is coupled to controller 124 and is adapted to move heads 110 relative to the surfaces of discs 104 in response to an actuation signal from controller 124.

To improve vibration-inhibiting capabilities, disc drive 100 employs retractable grounding device 107 of the present invention which includes a grounding connector that is mechanically removed from rotor shaft 106 when it is spinning and vibration sensitive read/write operations are being performed. The grounding is re-established, after completion of the read/write operations preventing static charge build up on the disc that could cause electrostatic discharge (ESD) damage to the heads. Thus, by employing retractable grounding contact 107, disc drive 100 prevents the introduction of vibrations due to rubbing between the spinning rotor shaft and the grounding contact, thereby improving its read/write performance characteristics.

Figure 3:
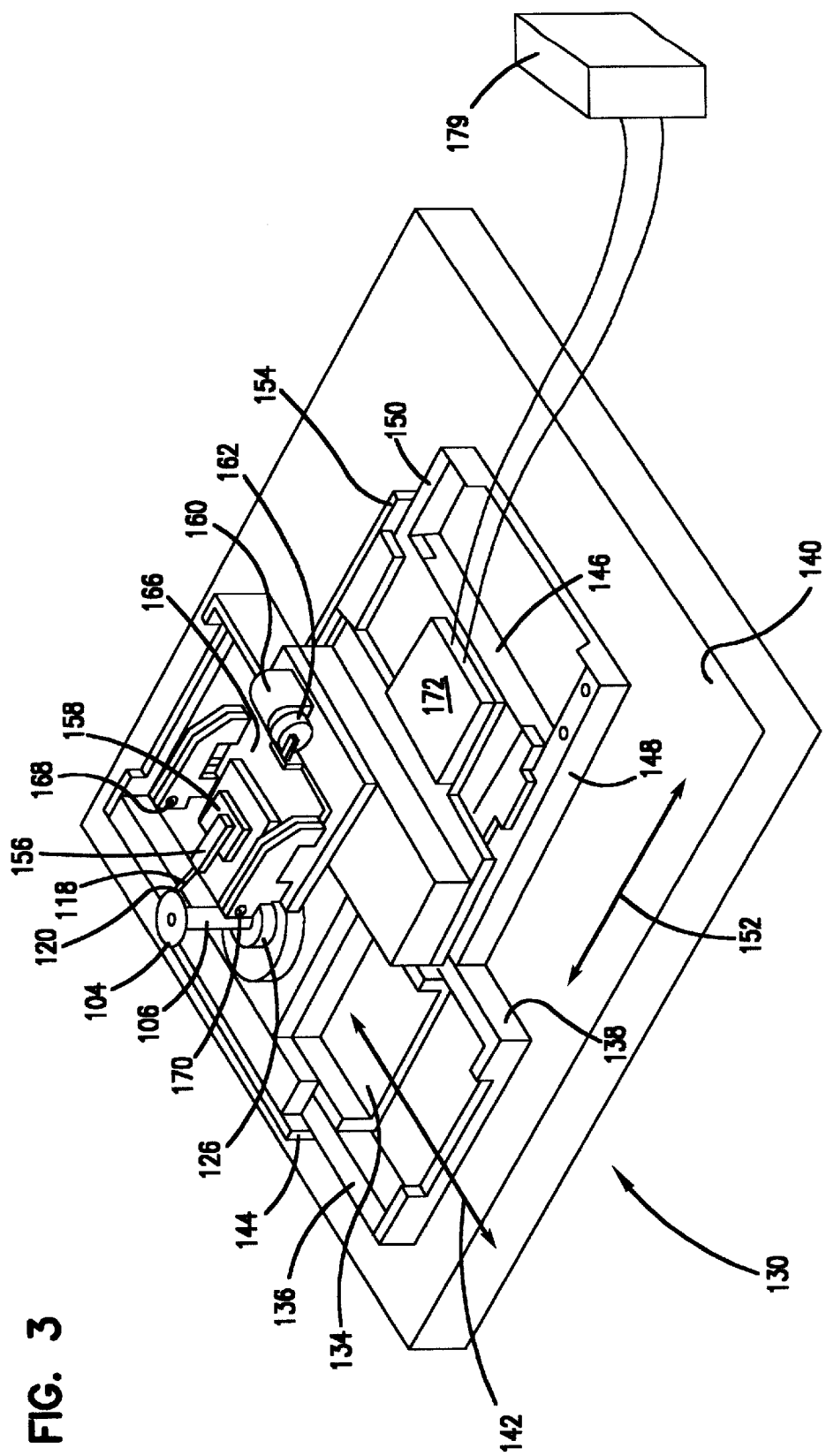
FIG. 3 is a perspective view of a spin-stand in which the present invention is also useful.

Referring now to FIG. 3, a perspective view of an example of a spin-stand 130 in which the present invention can be used is shown. Components in FIG. 3 which are the same or similar to the components identified with reference to disc drive 100 (FIGS. 1 and 2) are identified by the same numbers in FIG. 3. Spin-stand 130 includes a disc 104 which is mounted on spindle (shaft) 106 and rotated by spindle motor 126. Spindle motor 126 rests on platform 134 which moves between guide rails 136 and 138. Platform 134 can be supported by a cushion of air during movement and can be stabilized in a particular position by the application of a vacuum between platform 134 and granite base 140 located directly below platform 134. For purposes of reference, movement of platform 134 along guide rails 136 and 138 is considered to be in the "X" direction as shown by arrows 142. A position encoder 144 can be located, for example, along guide 136 to provide an indication of the position of platform 134.

Spin-stand 130 also includes a carriage 146 that moves between rails 148 and 150 in the "Y" direction as indicated by arrows 152. Similar to platform 134, carriage 146 can be supported by a cushion of air during movement and can be locked into position by applying a vacuum between carriage 146 and granite base 140. A position encoder 154 can be located, for example, along guide 150 to provide an indication of the position of carriage 146.

Carriage 146 and platform 134 both move using electromotive motors mounted between one of the guide rails and the respective platform or carriage. Other types of motors, such as a stepper motor, may be used in place of the electromotive motors. These motors generally perform coarse adjustment of a suspension assembly 118, which is connected to a suspension chuck 156 and supports a transducing head 120 proximate a surface of disc 104. In one embodiment, suspension chuck 156 is connected to piezo platform 158 through piezo elements that are able to move suspension chuck 156, generally in the "X" direction 142, to perform fine adjustment of transducing head 120 relative to disc 104.

During head loading operations, pivot motor 160 rotates eccentric cam 162 causing the back end of pivoting platform 166 to rotate upward about pivot pins 168 and 170. Carriage 146 can be moved forward so that transducing head 120, carried at the end of suspension assembly 118, moves under the spinning disc 104. Support platform 134 is also moved so that the head 120 is positioned at a desired radius along disc 104. When head 120 nears the desired location relative to disc 104, motor 160 rotates eccentric cam 162 back so that pivoting platform 166 returns to its level position and the head is brought into proximity with disc 104 so that head 120 can fly over the surface of disc 104.

Head 120 on suspension assembly 118 is connected by electrical leads to printed circuit 172, which has further connections to control box 174. Control circuitry, which is either part of circuit 172 or contained in control box 174, is used to control the positioning of head 120 on suspension assembly 118. The control circuitry for spin-stand 130 can be adapted to move head 120 to a test track on disc 104 which data is to be read from or written to. Additionally, the position of head 118 can be adjusted by the control circuitry to move head 118 to a number of different locations within the test track during readback, so that a profile of head 118 can be determined. Additional circuitry can be used to control the tests that are performed by spin-stand 130, such as error-rate testing, pulse width-fifty testing, track average amplitude testing, and track scan testing, all of which are familiar to those skilled in the art.

Figure 4:
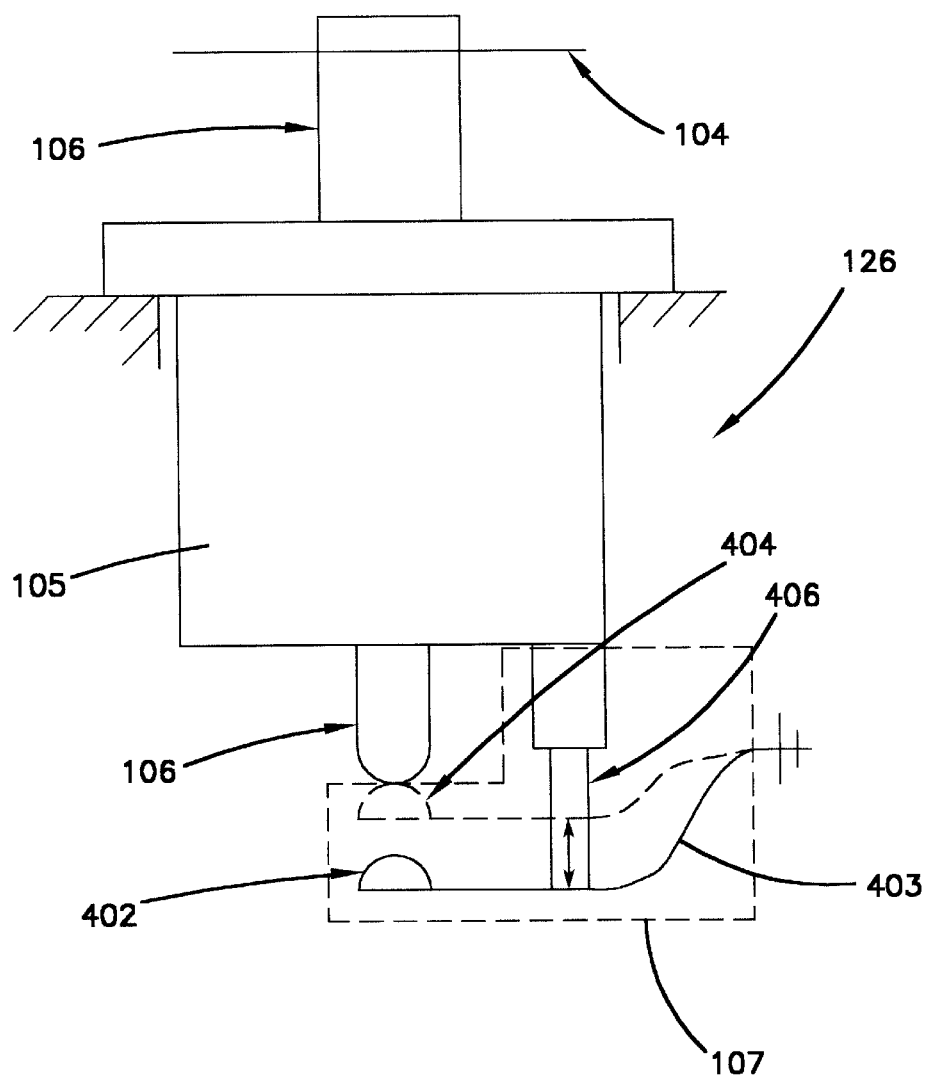
FIG. 4 is a block diagram of a spindle motor employing a retractable grounding device in accordance with an embodiment of the present invention.

To improve performance characteristics and to provide more accurate testing, spin-stand 130 employs spindle motor 126 that includes a retractable grounding device 107 (shown in FIG. 4). In FIG. 4, retractable grounding device 107 is shown to include grounding connector 403 and position adjuster 406. Grounding connector 403 is moved to test position 402 (retracted from rotor shaft) by position adjuster 406 when tests begin on the first read/write head and rotor shaft 106 starts spinning. When tests on the first read/write head end, rotor shaft 106 may or may not stop spinning, and grounding connector 403 is moved to contact position 404 (mechanically in contact with the rotor shaft) by position adjuster 406. When tests on a second read/write head commence, grounding connector 403 is again moved to test position 402.

Thus, grounding connector 403 remains in contact with rotor shaft 106 in between tests, and is retracted from shaft 106 during testing. Removing the grounding connector from the rotor shaft while a read/write head is under test prevents the introduction of vibrations due to rubbing between the spinning rotor shaft and the grounding connector. Re-grounding the shaft when tests on a head are complete prevents static charge build up on rotor shaft 106 and disc 104 that could cause ESD damage to the heads. Test periods for each head are typically small, for example, about 15 to 30 seconds. Therefore, re-grounding the rotor shaft after each test prevents static charge build up, thereby minimizing the possibility of ESD damage to the heads. Reduced vibration in spin-stand tester 130 resulting from the use of retractable grounding contact 107 improves the read/write performance characteristics of spin-stand 130. Improved tester performance results in an increase in read/write head yields.

Another benefit to temporarily removing the grounding contact from shaft 106 of spindle motor 126 in both disc drive 100 and spin-stand 130 is to break an RF antenna loop that is formed by a grounded rotor shaft and grounded read/write head circuitry.

Figure 5:
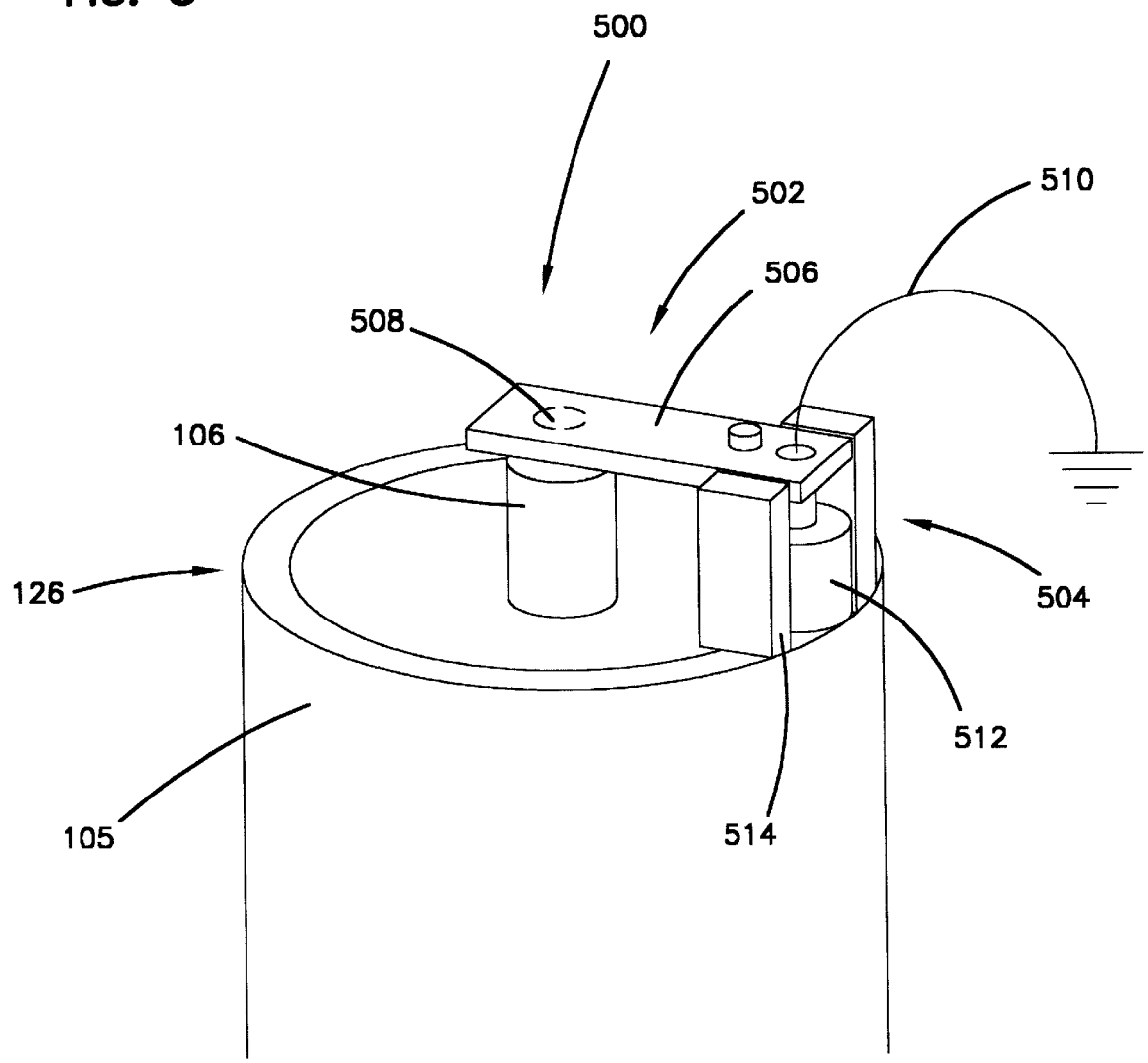
FIG. 5 is a perspective view of a retractable grounding device in accordance with an embodiment of the present invention.

Referring now to FIG. 5, an embodiment of a retractable grounding device 500 in accordance with the present invention is shown. Retractable grounding device 500 is shown connected to a bottom portion of spindle motor 126. Retractable grounding device 500 includes grounding connector 502 and position adjuster 504. Grounding connector 502 includes a leaf spring 506 and an electrical conductor 510. A first end of leaf spring 506 includes a button 508 for grounding rotor shaft 106. A second end of leaf spring 506 is connected to ground by electrical connector 510. Leaf spring 506 may be formed of beryllium-copper and grounding button 508 may be formed of silver impregnated carbon-graphite. Usually, grounding button 508 contacts a stainless steel spherical surface on rotor shaft 106. Position adjuster 504 includes solenoid 512, and mounting bracket 514. Solenoid 512 controls the movement of leaf spring either away from the end of rotor shaft 106 for isolation of rotor shaft 106 or against the end of rotor shaft 106 for grounding rotor shaft 106. Mounting bracket 514 is coupled to stator 105 and helps align solenoid 512 and supports the other elements of retractable grounding device 500. Solenoid 512 may be air actuated, electrically actuated, etc. The combination of leaf spring 506 and solenoid 512 are only examples of components that may be used to construct retractable grounding device 500. Any type of grounding contact combined with a device capable of moving the grounding contact may be employed in the present invention. The retractable grounding device of the present invention may be controlled by software running on a disc drive or a spin-stand tester. The retractable grounding device may be configured to unground only during critical tests, such as error-rate and track-scan testing.

In summary, a retractable grounding device (such as 107, 500) for a spindle motor (such as 126) having a rotor shaft (such as 106) includes a grounding connector (such as 403, 502) that connects the rotor shaft (such as 106) to ground and a position adjuster (such as 406, 504) coupled to the grounding connector (such as 403, 502). The position adjuster (such as 406, 504) moves the grounding connector (such as 403, 502) between a first position where the grounding connector is in contact with the rotor shaft (such as 404) and a second position where the grounding connector is retracted from the rotor shaft (such as 402).

A method of grounding a rotor shaft (such as 106) of a spindle motor (such as 126) includes disconnecting the shaft (such as 106) from ground when the shaft (such as 106) is spinning and re-connecting the shaft (such as 106) to ground when the shaft (such as 106) is stationary.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the spindle motor while maintaining substantially the same functionality without departing from the scope and spirit of the present invention. In addition, although the preferred embodiment described herein is directed to a spindle motor for disc drives and spin-stand testers, it will be appreciated by those skilled in the art that the teachings of the present invention can be applied to other systems that employ spindle motors, without departing from the scope and spirit of the present invention.

What is claimed is:

1. A retractable grounding device for a spindle motor having a rotor shaft, the retractable grounding device comprising:

a grounding connector adapted to connect the rotor shaft to ground; and a position adjuster coupled to the grounding connector, the position adjuster adapted to move the grounding connector between a first position where the grounding connector is in contact with the rotor shaft and a second position where the grounding connector is retracted from the rotor shaft.

2. The retractable grounding device of claim 1 wherein the grounding connector comprises:

a leaf spring having a first end and a second end;

a grounding button coupled to the first end of the leaf spring, the grounding button adapted to contact the rotor shaft; and an electrical conductor coupled between the second end of the leaf spring and ground.

3. The retractable grounding device of claim 2 wherein the leaf spring is formed of beryllium-copper.

4. The retractable grounding device of claim 2 wherein the grounding button is formed of silver impregnated carbon-graphite.

5. The retractable grounding device of claim 2 wherein the grounding button contacts a stainless steel surface on the rotor shaft.

6. The retractable grounding device of claim 2 wherein the position adjuster comprises a solenoid coupled to the second end of the leaf spring, and wherein the solenoid is adapted to move the leaf spring between the first position and the second position.

7. The retractable grounding device of claim 6 wherein the solenoid is air actuated.

8. The retractable grounding device of claim 6 wherein the solenoid is electrically actuated.

9. The retractable grounding device of claim 6 wherein the position adjuster further comprises mounting bracket coupled to a stator of the spindle motor, wherein the mounting bracket is adapted to align the solenoid for moving the leaf spring.

10. A disc storage system employing the retractable grounding device of claim 1.

11. The apparatus of claim 10 wherein the retractable grounding device is controlled by software running on the disc storage system.

12. A spin-stand tester employing the retractable grounding device of claim 1.

13. The apparatus of claim 12 wherein the retractable grounding device is controlled by software running on the spin-stand tester.

14. A method of grounding a rotor shaft of a spindle motor, the method comprising:

(a) disconnecting the shaft from ground when the shaft is spinning; and (b) re-connecting the shaft to ground when the shaft is stationary.

15. The method of claim 14 wherein:

step (a) further comprises retracting a grounding contact from the rotor shaft; and step (b) further comprises re-connecting the grounding contact to the rotor shaft.

16. A disc storage system implementing the method of claim 14.

17. A spin-stand tester implementing the method of claim 14.

18. A spindle motor for rotating a disc, comprising:

a rotor shaft that rotates the disc; and a retractable grounding means for selectively grounding the rotor shaft.

* * * * *